United States Patent [19]

Tsukamoto

[11] Patent Number: 4,872,772
[45] Date of Patent: Oct. 10, 1989

[54] THERMAL RECORDER FOR PRINTING DOT PATTERNS HAVING HIGHER DENSITY AT ENDS OF PATTERN

[75] Inventor: Takahiro Tsukamoto, Mitaka, Japan

[73] Assignee: Canon Kabushiki Kaisha, Tokyo, Japan

[21] Appl. No.: 283,058

[22] Filed: Dec. 5, 1988

Related U.S. Application Data

[63] Continuation of Ser. No. 9,570, Jan. 30, 1987, abandoned, which is a continuation of Ser. No. 861,123, May 7, 1986, abandoned, which is a continuation of Ser. No. 704,936, Feb. 25, 1985, abandoned.

[30] Foreign Application Priority Data

Mar. 1, 1984 [JP] Japan .................................. 59-37337
Jun. 22, 1984 [JP] Japan ................................ 59-127395

[51] Int. Cl.⁴ .............................................. B41J 3/02
[52] U.S. Cl. ................ 400/120; 346/76 PH
[58] Field of Search ...................... 400/120, 304, 88; 346/76 PH

[56] References Cited

U.S. PATENT DOCUMENTS

| | | | |
|---|---|---|---|
| 3,973,661 | 8/1976 | Boo et al. ............................. | 400/328 |
| 4,388,005 | 6/1983 | Wehking et al. .................... | 400/304 |
| 4,415,907 | 11/1983 | Suemori .......................... | 346/76 PH |
| 4,415,908 | 11/1983 | Sugiura .......................... | 346/76 PH |
| 4,417,257 | 11/1983 | Mitsui ............................ | 346/76 PH |
| 4,429,318 | 1/1984 | Kozata ............................ | 346/76 PH |
| 4,431,319 | 2/1984 | Karaki et al. ....................... | 400/124 |
| 4,433,925 | 2/1984 | Fujiwara et al. ..................... | 400/88 |
| 4,442,342 | 4/1984 | Yoneda .......................... | 346/76 PH |
| 4,444,520 | 4/1984 | Hawakata ............................. | 400/88 |
| 4,464,669 | 8/1984 | Sekiya et al. .................... | 346/76 PH |
| 4,479,132 | 10/1984 | Iwakura .......................... | 346/76 PH |
| 4,492,965 | 1/1985 | Ohnishi et al. ....................... | 346/1.1 |
| 4,559,542 | 12/1985 | Mita .............................. | 346/76 PH |

FOREIGN PATENT DOCUMENTS

| | | | |
|---|---|---|---|
| 2813640 | 11/1978 | Fed. Rep. of Germany . | |
| 3231086 | 2/1984 | Fed. Rep. of Germany . | |
| 63675 | 5/1981 | Japan ................................ | 400/304 |
| 14755 | 1/1983 | Japan ................................ | 400/304 |
| 29678 | 2/1983 | Japan ................................ | 400/304 |
| 71168 | 4/1983 | Japan ................................ | 400/304 |
| 76282 | 5/1983 | Japan ................................ | 400/304 |
| 102779 | 6/1983 | Japan ................................ | 400/304 |

*Primary Examiner*—Eugene H. Eickholt
*Attorney, Agent, or Firm*—Fitzpatrick, Cella, Harper & Scinto

[57] ABSTRACT

A recorder controls a record unit to print a portion of a line of record formed on a record paper by the record unit at a different record density than that of the remaining portion of the line of record.

10 Claims, 6 Drawing Sheets

THERMAL RECORDER FOR PRINTING DOT PATTERNS HAVING HIGHER DENSITY AT ENDS OF PATTERN

This application is a continuation of application Ser. No. 009,570 filed Jan. 30, 1987 now abandoned, which in turn is a continuation of application Ser. No. 861,123 filed May 7, 1986, now abandoned, which in turn is a continuation of application Ser. No. 704,736, filed Feb. 25, 1985, now abandoned.

BACKGROUND OF THE INVENTION

1. Field of the Invention

The present invention relates to a printer for printing characters, symbols, graphic patterns and images, and more particularly to a battery-operated dot-print thermal printer.

2. Description of the Prior Art

A dot-print printer which serially reads out print data from a character generator ROM and prints them under a control of a control circuit such as a microcomputer has been known. In the printer, a print unit (hereinafter referred to as a head) is mounted on a carriage and print elements of the head print dot patterns in synchronism with a timing of movement of the carriage in a print direction. In such a printer, since the dot patterns are printed with one-dot print width of the print element being equal to one-dot shift distance of the head, dots are overlapped or spaced if the dot shift distance is nonuniform when the head is moved. When an oblique pattern is printed, a smoothness of the pattern is not obtained in many cases. In a battery-operated printer, the above problems are remarkable because of a voltage variation.

In order to resolve those problems, the number of dots of a character generating ROM may be increased or a control circuit for precisely controlling the shift distance of the head may be provided. In this case, however, the lifetime of the printer battery is shortened.

In another approach, the one-dot shift distance of the head is set to be smaller than the one-dot print width of the head so that the dots are printed in an overlapped fashion. However, since the print density of each dot is constant, the dots at the opposite ends of a line of dots are of lower density than the overlapped dots and the printed characters are not sharp.

SUMMARY OF THE INVENTION

It is an object of the present invention to provide a battery-operated dot-print printer which can print sharp characters.

In order to achieve the above object, the present recorder is equipped with a recording unit and control means for recording a portion of a line of record differently from the remaining portion of the line of record when such line of record is recorded by the recording element on a record paper.

DETAILED DESCRIPTION OF THE PREFERRED EMBODIMENTS

Figure 1:
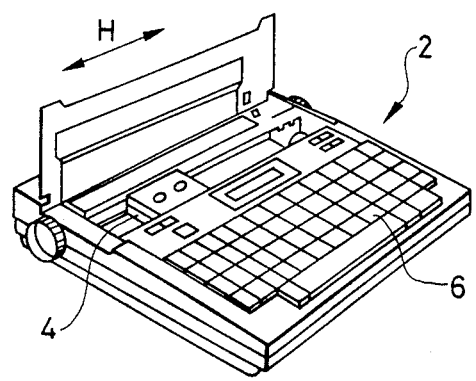
FIG. 1 is a perspective view of a printer.
Figure 2:
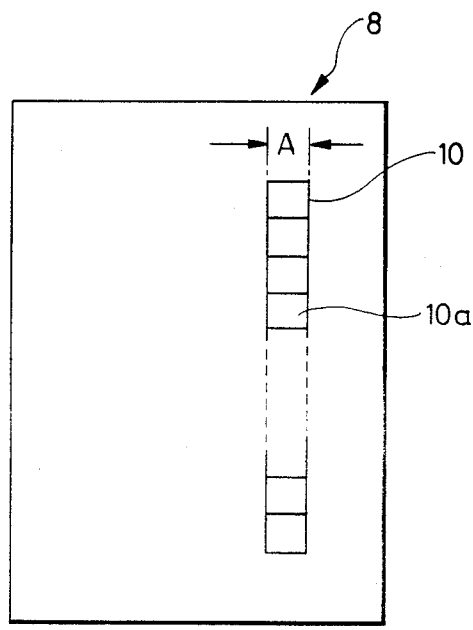
FIG. 2 is a schematic view of a head.
Figure 3:
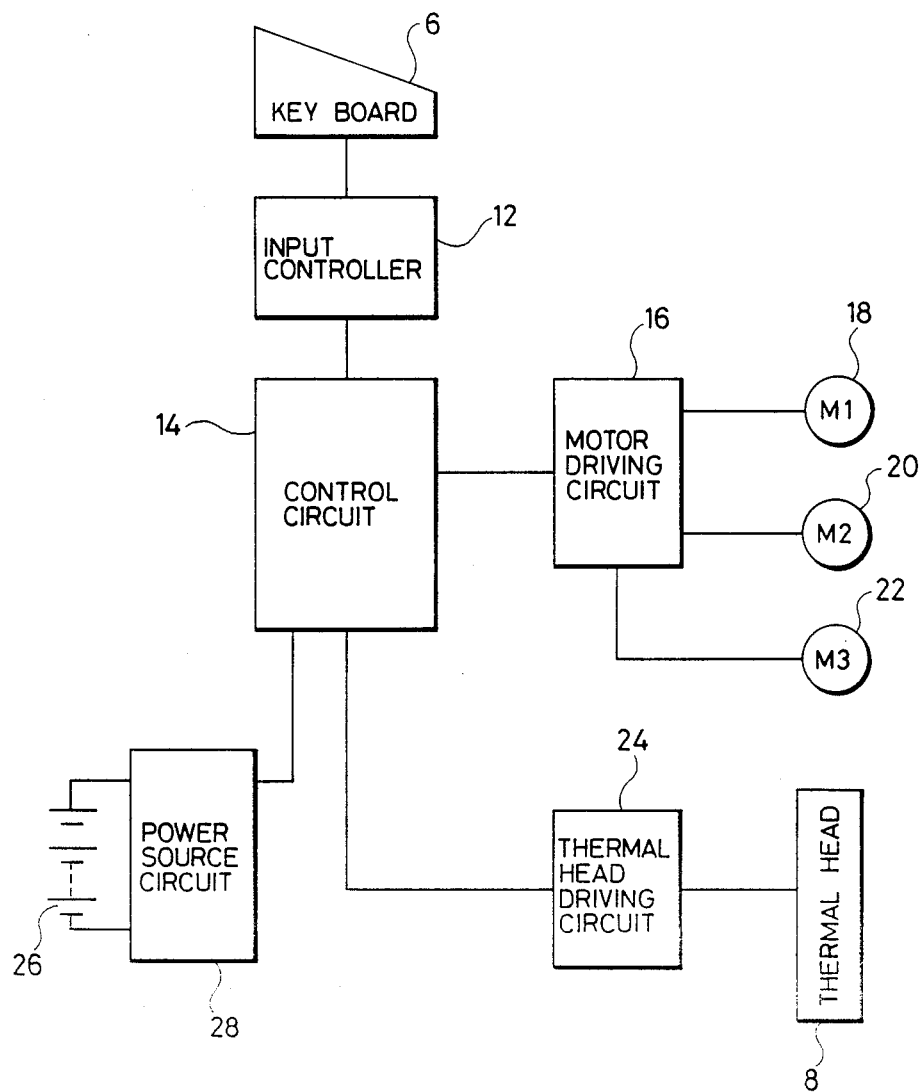
FIG. 3 is a block diagram of a printer in accordance with one embodiment of the present invention.

FIG. 1 shows a perspective view of a printer in which numeral 2 denotes the printer, numeral 4 denotes a carriage on which a thermal head is mounted and which is movable in a direction H, and numeral 6 denotes a keyboard. FIG. 2 shows a plan view of the thermal head 8 with print unit 10 arranged in a line. The print unit 10 has a width A which corresponds to a one-dot print width. FIG. 3 is a block diagram of the present embodiment. Numeral 6 denotes the keyboard and numeral 12 denotes an input controller which converts a character input from the keyboard into a signal and supplies it to a control circuit 14. The control circuit 14 includes a microcomputer, a memory which stores therein information to be recorded and control information, an arithmetic logic unit and a dot pattern character generator ROM. Numeral 16 denotes a motor drive circuit, numeral 18 denotes a motor for contacting the thermal head 8 to a print paper, numeral 20 denotes a carriage motor (stepping motor) for driving the carriage 4, numeral 22 denotes a paper feed motor to which a signal is supplied from the control circuit 14 through a motor drive circuit 16 to drive the motor 18, carriage 20 and paper feed motor 22, and numeral 24 denotes a thermal head drive circuit. The control circuit 14 drives the carriage motor 20, reads out the content of the character generator ROM, drives the thermal head drive circuit 24 and heats a print element 10a of the print unit 10 of the thermal head 8 which corresponds to the content of the ROM. Numeral 26 denotes a battery and numeral 28 denotes a power supply which is a power source for the printer 2.

Figure 4:
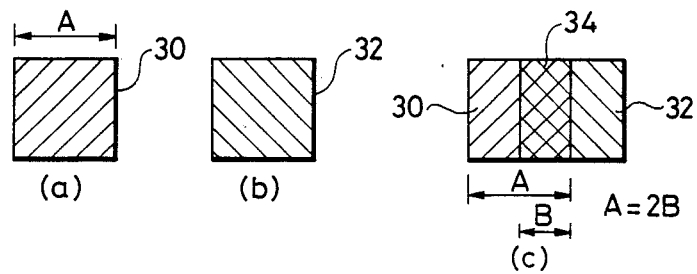
FIG. 4 shows dots printed by a print unit.
Figure 5:
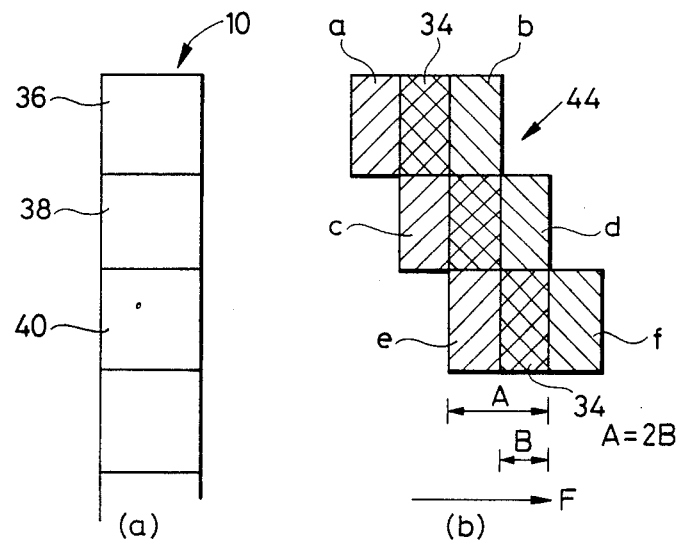
FIG. 5 shows the print unit and an oblique print pattern formed thereby.
Figure 6:
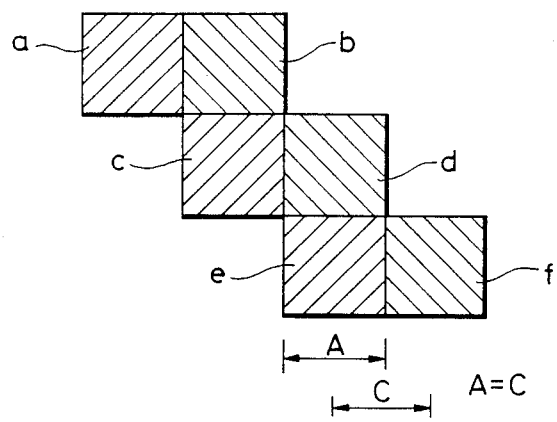
FIG. 6 shows formation of an oblique print pattern.

FIG. 4 shows dots printed by the print elements 10a of the print unit 10. In the present embodiment, the one-dot shift distance of the head is controlled by the control circuit 14 to be one half of the print width of the print unit 10 so that dots are printed by the print elements 10a in the overlapped fashion. FIG. 4(a) shows a dot printed in a first cycle (first dot) which is marked with right-upward hatching. FIG. 4(b) shows a dot printed in a second cycle (second dot) by the same print element 10a, which is marked with right-downward hatching. The character A represents the dot print width. The dot print width A is twice as wide as the one-dot shift distance B (A=2B). Thus, dots are always printed in the overlapped fashion so that an overlapped area 34 is formed between the first dot 30 and the second dot 32 as shown in FIG. 4(c). FIG. 5 shows the print unit 10 of the thermal head 8 and an oblique print pattern 44 formed by the print unit 10. In order to form the oblique print pattern 44, the first print element 36 is first actuated. Since the thermal head 8 is moving in the direction F, the first dot a is printed by the first print element 36 and then the second dot b is printed. The second print element 38 is simultaneously actuated to print the first dot c. Then, the first print element 36 is deactuated and the second dot d is printed by the second print element 38 and the first dot e is simultaneously printed by the third print element 40. Then, the second print element 38 is deactuated and the second dot f is printed by the third print element 40. In this manner, the oblique print pattern 44 including the overlapped area 34 is formed. Because of the overlapped print, the oblique lines of the oblique print pattern 44 are smooth. Further, because of the overlapped area 34, the print density is high. Since the dot print width A is twice as wide as the one-dot shift distance B of the head, in the present embodiment the dots are not printed in spaced relation until the status shown in FIG. 6 (in which the dot print width A = one dot shift distance C of the head) takes place, even if the dot shift distance is not uniform.

In the present embodiment, the print width A of the print unit 10 is twice as wide as the one-dot shift distance B (A=2B). Alternatively, A and B may have another relation so long as A>B.

In accordance with the present embodiment, the one-dot shift distance of the head is selected to be smaller than the one-dot print width to perform the overlapped print. Accordingly, the smoothness of the oblique pattern is enhanced, the print density is increased and the sharp print is attained. Further, the lifetime of the battery is extended because the print is effected at a low voltage.

Figure 7:
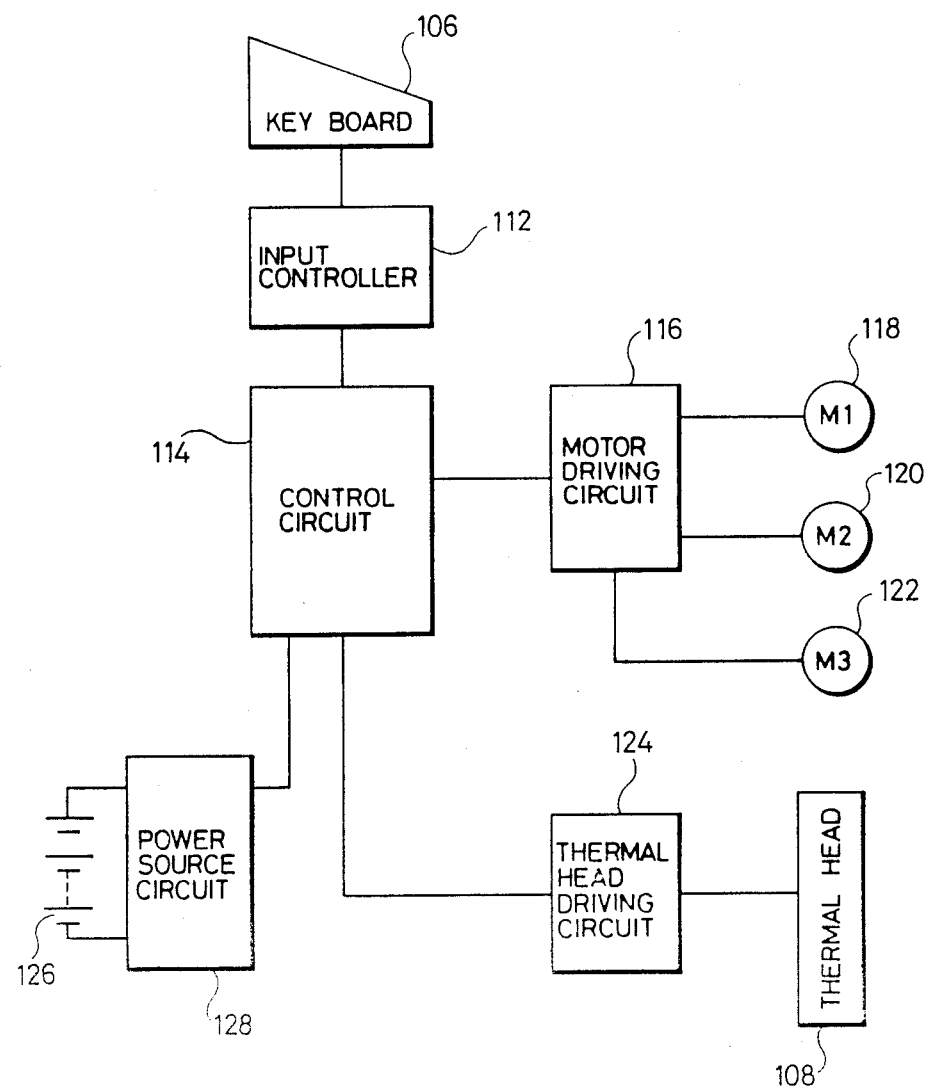
FIG. 7 is a block diagram of another embodiment of the present invention.
Figure 10:
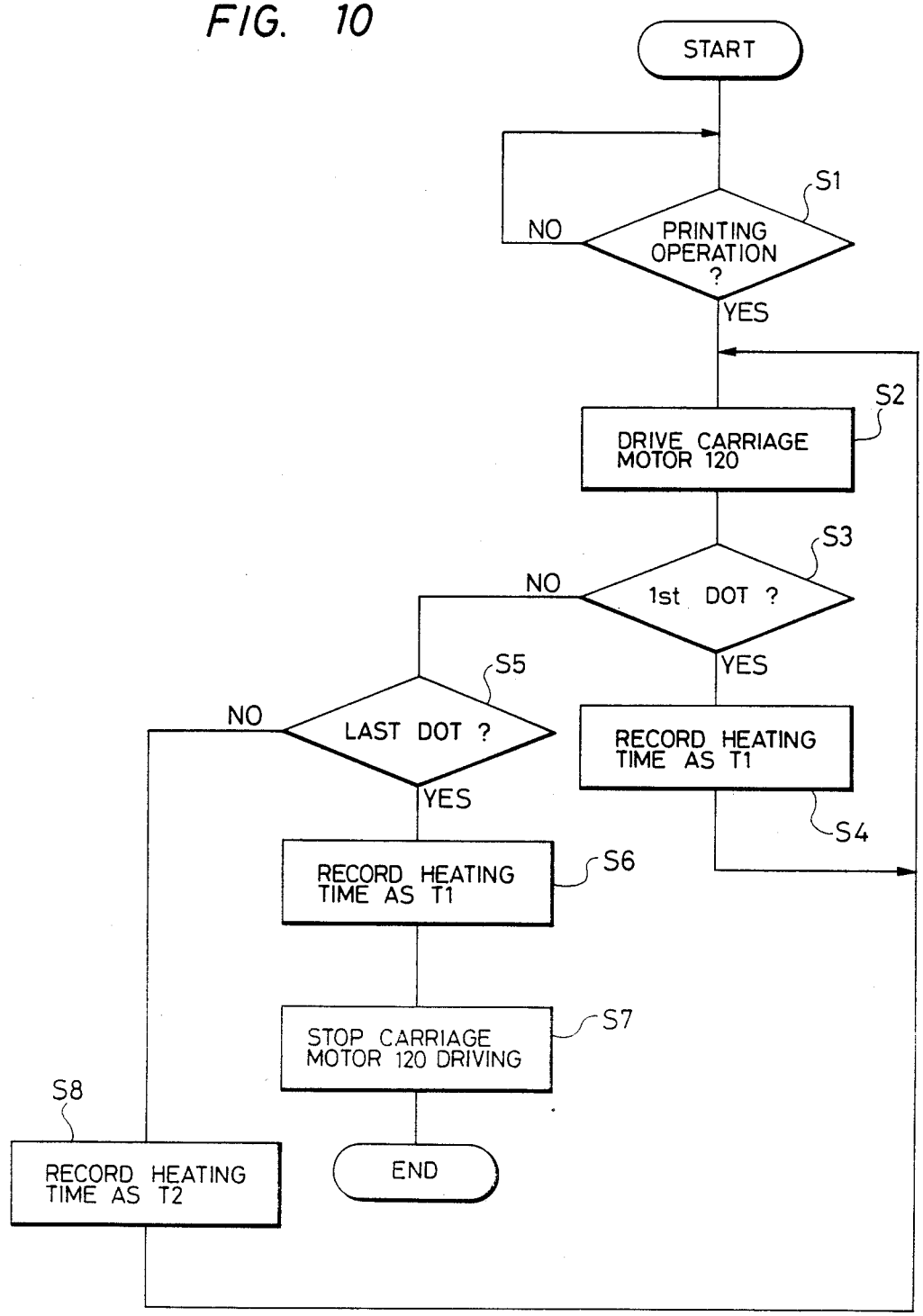
FIG. 10 is a flow chart of an operation of a control circuit of FIG. 7.

FIG. 7 shows another block diagram of the recorder of the present invention shown in FIG. 1. Numeral 112 denotes an input controller which converts input data such as a character from a keyboard 106 to an interval signal and supplies it to a control circuit 114. The control circuit 114 includes a microcomputer, a memory for storing therein an input character, an arithmetic logic unit and a dot pattern character generator ROM which stores therein a control procedure shown in FIG. 10, and which is operated by the stored program as shown in FIG. 10. Numeral 118 denotes a head motor for contacting and separating a thermal head 108 (with a print unit having print elements similar to the print unit 10 shown in FIG. 2) to and from a print paper, numeral 120 denotes a carriage motor for driving a carriage 104, and numeral 122 denotes a paper feed motor for feeding the print paper in a sub-scan direction. Drive signals are supplied from the control circuit 114 to the motors 118, 120 and 122 through the motor drive circuit 116 to drive the head motor 118, carriage motor 120 and paper feed motor 122. Numeral 124 denotes a thermal head drive circuit for driving the thermal head 108. The control circuit 114 drives the carriage motor 120, reads out the content (dot pattern) of the character generator ROM in accordance with the input data, drives the thermal head drive circuit 124 in accordance with the dot pattern data, and heats the print elements of the print unit corresponding to the content of the ROM read out to print the character on the print paper. Numeral 126 denotes a battery and numeral 128 denotes a power supply connected between the battery 126 and the control circuit 114, which is a power source for the recorder.

Figure 8:
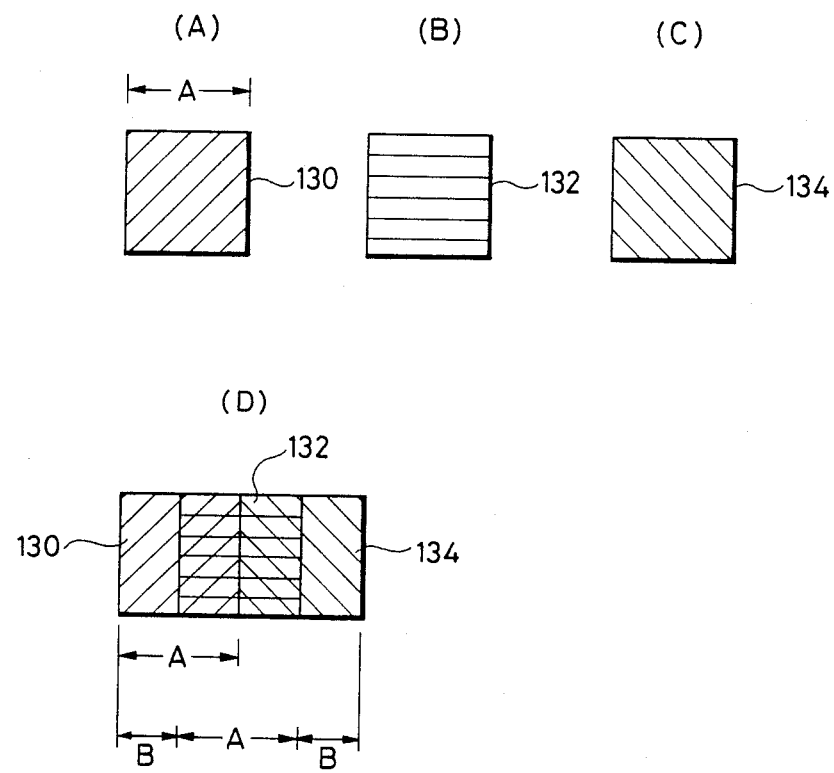
FIGS. 8A ~ 8D show dots printed by the print unit of FIG. 7.

FIGS. 8(A) to 8(D) show three dots which are printed successively by the print elements of the print unit. In the present embodiment, the head 108 is driven through the motor drive circuit 116 under the control of the control circuit 114 in such a manner that one-dot shift distance of the head 108 is one half of a print width of the print elements so that overlapped printing is effected by the print elements. FIG. 8(A) shows a dot 130 (first dot) printed in a first cycle, which is marked with right-upward hatching, FIG. 8(B) shows a dot (second dot) printed in a second cycle by the same print element, which is marked with horizontal hatching, and FIG. 8(C) shows a dot 134 printed in a third cycle by the same print element, which is marked with right-downward hatching. The letter A shows the one-dot print width, as shown in FIG. 8(D), the dot print width A is twice as wide as the one-dot shift distance B (A=2B) of the thermal head 108 so that dots are always printed in the overlapped fashion. Accordingly, the dot overlapping area is formed in the second dot 132 between the first dot 130 and the third dot 134.

Figure 9:
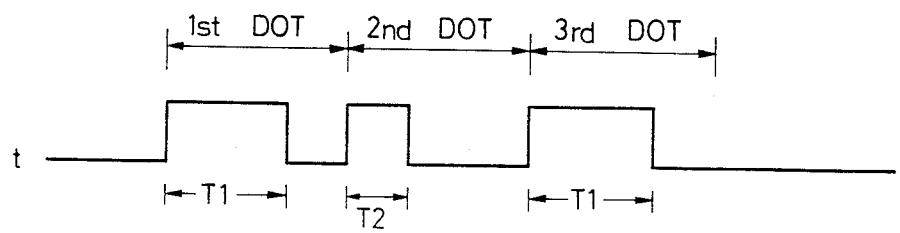
FIG. 9 shows a timing for a heat generation time for the printing of FIG. 8.

FIG. 9 shows a heating time of the print elements of the thermal head 108 when the dot pattern is to be printed. A heating time T1 for the first dot 130 and the third dot 134 is longer than a heating time T2 for heating the second dot 132. As a result, a print density of the second dot 132 which is the dot overlapping area shown in FIG. 8(D) and a print density of the areas of the first dot 130 and the third dot 134 which do not overlap with the second dot 132 are substantially equal and a high print density is attained. In the present embodiment, since the dot print width A is twice as wide as the one-dot shift distance B, the dots are not printed in spaced relation until the status of A=B occurs even if the dot shift distance is not uniform. While the print width A of the print unit and the one-dot shift distance B of the head have the relation of A=2B in the present embodiment, they may have other relation for example A=3B so long as A>B.

Referring to a flow chart of FIG. 10, the operation of the control circuit 114 of FIG. 7 is explained.

After the power-on, a print operation command from the keyboard 106 is monitored. When the print operation command is detected (step S1), the carriage motor 120 is driven through the motor drive circuit 116 (step S2). Then, whether heating of the thermal head 108 is to be started or not, that is, whether printing of a first dot or not is determined (step S3). If it is the printing for the first dot, the heat time T1 for the thermal head 108 is read from the ROM (see FIG. 9), the dot is printed through the thermal head drive circuit 124 (step S4), and the process returns to the carriage motor drive routine of the step S2.

In the step S3, if the printing is not for the first dot, whether the heating of the thermal head is to be terminated or not, that is, whether the printing is for the last dot or not is checked (step S5). If it is for the last dot, the heat time T1 for the thermal head 108 is read from the ROM and the dot is printed (step S6), and the carriage motor 120 is deenergized through the motor drive circuit 116 (step S7). On the other hand, in the step S5, if it is not the printing for the last dot, the heat time T2 for the thermal head 108 is read from the ROM (see FIG. 9) and the dot is printed through the thermal head drive circuit 124 (step S8). Then, the process returns to the carriage motor drive routine of the step S2.

As described hereinabove, according to the present embodiment, the one-dot shift distance of the recording head is smaller than the one-dot print width to attain the overlapped printing, and the print density at the opposite ends of the series of dots is increased. Accordingly, the print density at the opposite ends is increased and the sharp print is attained. Further, the battery lifetime is extended because the printing is effected at the low voltage.

What is claimed is:

1. A printer comprising:

a thermal head having a plurality of heat generating elements for providing dots on a recording medium;

generating means for generating dot patterns to be recorded on the recording medium by said plurality of heat generating elements;

control means for changing the relative position of the recording medium and said thermal head by an amount smaller than the size of said plurality of heat generating elements; and driving means for selectively driving said plurality of heat generating elements so as to record dots at the ends of the dot patterns with a higher print density than other dots of the dot patterns.

2. A printer according to claim 1, wherein said driving means includes means for changing the period during which said plurality of heat generating elements are driven to provide the differing dots and the different dot is recorded along with other dots to provide a dot pattern.

3. A printer according to claim 1, further comprising a movable carriage having said thermal head mounted thereon for changing the relative position of said thermal head and the recording medium.

4. A printer according to claim 3, wherein said control means includes means for moving said carriage:

5. A printer comprising:

a head having a plurality of print elements for providing dots on a recording medium;

a movable carriage having said head mounted thereon for changing the relative position of said head and the recording medium;

control means for moving said carriage along a print line on the recording medium by an amount smaller than the size of said plurality of print elements;

generating means for generating dot patterns to be recorded on the recording medium by said plurality of print elements;

discriminating means for discriminating dots at the ends of a dot pattern generated by said generating means; and driving means for driving said plurality of print elements to record the discriminated dots at the ends of the dot patterns with a higher print density than other dots of the dot patterns, said driving means being operable to change the period during which said print elements are driven in order to change the print density of the discriminated dots.

6. A printer according to claim 5, wherein said plurality of print elements are arranged in a line.

7. A printer according to claim 5, wherein said generating means includes means for generating dot patterns representing a character.

8. A printer comprising:

a thermal head having a plurality of heat generating elements for providing dots on a recording medium;

a movable carriage having said thermal head mounted thereon for changing the relative position of said thermal head and the recording medium;

generating means for generating dot patterns to be recorded on the recording medium by said plurality of heat generating elements;

control means for moving said carriage along a record line on the recording medium by an amount smaller than the size of said plurality of heat generating elements each time a dot pattern generated by said generating means is applied to said thermal head;

checking means for checking dot patterns generated by said generating means; and driving means for driving said thermal head to record dots at the end of said dot patterns with a higher density than other dots in response to the checking of the dots made by said checking means.

9. A printer according to claim 8, wherein said generating means includes means for generating dot patterns representing a character.

10. A printer according to claim 8, wherein said plurality of heat generating elements are arranged in a line.

* * * * *

UNITED STATES PATENT AND TRADEMARK OFFICE
CERTIFICATE OF CORRECTION

PATENT NO. : 4,872,772

DATED : October 10, 1989

INVENTOR(S) : Tsukamoto

It is certified that error appears in the above-identified patent and that said Letters Patent is hereby corrected as shown below:

On the title page, under item [56] References Cited,

U.S. PATENT DOCUMENTS

Line 1, change "Boo et al." to --De Boo et al.--

Signed and Sealed this

Twenty-eighth Day of May, 1991

*Attest:*

HARRY F. MANBECK, JR.

*Attesting Officer*   *Commissioner of Patents and Trademarks*